Jan. 10, 1967   J. M. P. CARRASSE   3,297,189
THERMAL INSULATORS
Filed Sept. 27, 1963   3 Sheets-Sheet 2
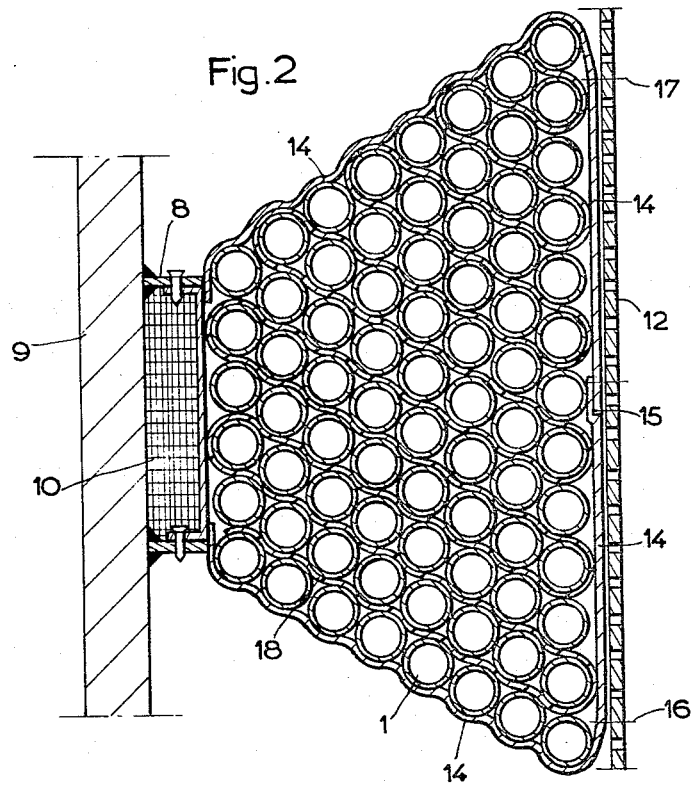
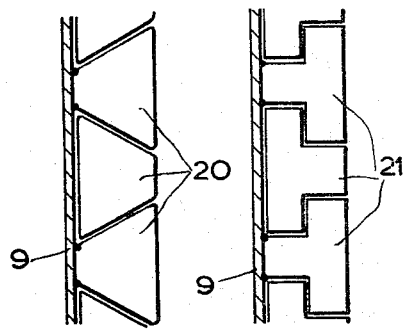
INVENTOR
J.M.P. CARRASSE
BY
Holcombe, Wetherill & Brisebois
ATTORNEYS Jan. 10, 1967  J. M. P. CARRASSE  3,297,189
THERMAL INSULATORS
Filed Sept. 27, 1963  3 Sheets-Sheet 3
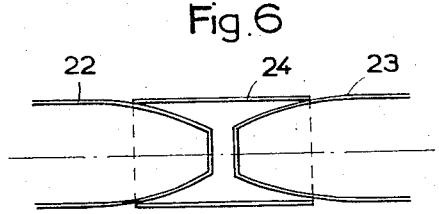
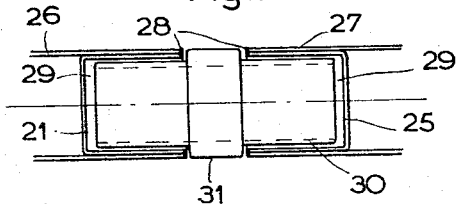
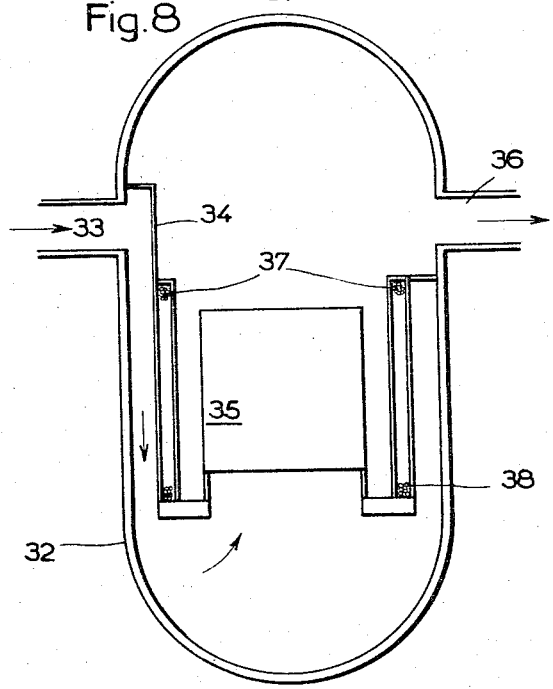
INVENTOR
J.M.P. CARRASSE
BY
Holcombe, Wetherill & Brisebois
ATTORNEYS

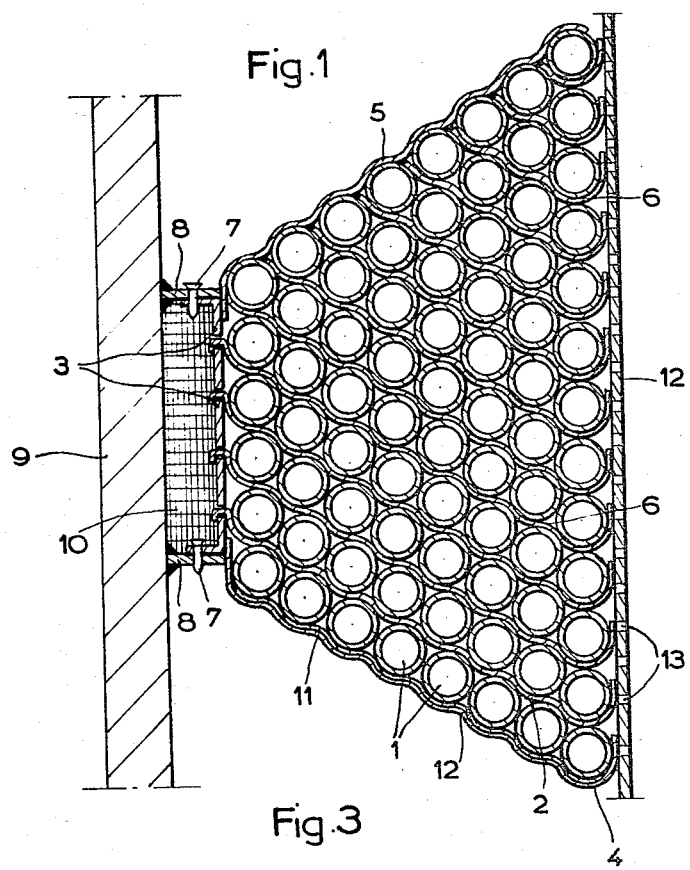

United States Patent Office 3,297,189
Patented Jan. 10, 1967

3,297,189
THERMAL INSULATORS
Jean Marie Pierre Carrasse, Antony, France, assignor to Societe Generale de Constructions Electriques et Mecaniques (Alsthom) Paris, France, a corporation of France
Filed Sept. 27, 1963, Ser. No. 312,171
Claims priority, application France, Oct. 1, 1962, 2,360, Patent 1,344,343
3 Claims. (Cl. 220—15)

The effectiveness of most insulating bodies is due to the large differences in thermal conductivity between normal solids and gases, and in particular air at atmospheric pressure. In a common form of heat insulator, the presence of gas-filled cavities in the body of the insulating material results in a reduction in the overall conductivity of the material. Hence, for a given raw material, the thermal conductivity is increased as the mean density is increased, and vice-versa.

Thus, a cellular or spongy material has the advantage of having a lower overall thermal conductivity than the same material when compact, since the highly conductive spaces in the former have been replaced by equivalent spaces containing gases which are less conductive. The cellular or spongy material also has a lower overall thermal conductivity than the gas alone (even when it is divided up by anti-radiation screens, and in spite of the fact that the intrinsic conductivity of the gas is lower), due to the greater division of the elementary volumes of gas by the spongy material, which reduces the amplitude of movements caused by natural convection currents, and reduces the extent of the corresponding heat transfer.

However, there is a very distinct increase in the overall conductivity of a porous material when the fluid inside the enclosure to be heat-insulated is very dense, for example, if it is a gas under pressure, or a liquid. In the case of liquids, this is due to the high intrinsic conductivity of liquids compared with that of gases, and also to the high value of liquid/solid convection coefficients. In the case of gases under pressure, the increase in the specific weight is accompanied by only very slight variations in intrinsic conductivity, but this increase does, however, give rise to an acceleration of the movement caused by convection currents, and to a rise in the gas/solid exchange coefficient. The resulting increase in conductivity can be prevented only by preventing the dense fluid from acting as a good heat conductor in the heat-insulating body or material.

The present invention permits this result to be obtained without involving hermetically sealed or fluid-tight pressure-resistant compartments or enclosures isolating the heat-insulator from the fluid. The object of the invention is to provide improved non-sealed heat-insulators, and to this end, the invention consists in a non-sealed insulator comprising elementary juxtaposed enclosures which are easy to manufacture, are of small volume and are sealed and pressure-resistant, within which it is possible to introduce a fluid which may or may not be distinct from the external fluid and which is preferably at a low pressure, so as to limit the phenomena of heat-exchange by convection occurring in it. These elementary enclosures are advantageously stacked in layers, staggered with respect to one another, and may be insulated from one another by an insulating packing, with or without positioning members for the elementary enclosures, the orientation of the elementary enclosures being selected as a function of the arrangement, shape and orientation of the surface to be protected. Furthermore, it is possible to intercalate thin insulating or reflecting sheets between the layers of enclosures, which substantially prevent convection between layers.

Exchanges between the heat-insulator and the conductive fluid are then effected by natural convection only on the exterior of the elements, in a volume which may represent only a small fraction of the total volume if there is an appropriate choice of the geometrical arrangement. The effect of the stack of elementary enclosures thus formed is to prevent direct passages from the fluid under pressure to be heat-insulated and to limit the conduction effect due to contact between successive elements.

The elementary enclosures may simply take the form of tubes of a circular, hexagonal or other cross-section, sealed at both ends. The air originally inside these tubes may be evacuated, or, if there is a risk of leakage, replaced by the same fluid as that contained in the protected enclosure, but at a lower pressure. The interior of these tubes may also be provided with screens or with an anti-radiation packing.

In another form, for example, for the protection of vertical cylindrical surfaces, these tubes may be curved and their two ends soldered or welded end to end to form rings.

In some cases, it may be advantageous to replace the cylinders or rings by spheres, tetrahedrons or cubes.

In the case of a heat-insulator with a vertical plane or cylindrical surface, the elementary enclosures are preferably horizontally stacked and staggered in the horizontal plane. Thin anti-convection sheets may be arranged in horizontal layers so as to eliminate or reduce the risk of permeation of the gas over any considerable vertical distance. In the case of vertical cylindrical surfaces of small diameter, elementary enclosures comprising curved tubes in the form of rings or tori are particularly suitable.

In the case of horizontal plane surfaces, the tubes may still be arranged horizontally, parallel to one another from one sheet to another, the insulating sheets also being horizontal. It is then advantageous to stagger the tubes vertically.

In the case of horizontal cylindrical surfaces, the tubes are stacked parallel to the generatrices of the cylinder, the tubes of one layer being staggered with respect to those of the next.

If the surfaces are vertical but not very high, and if the nature of the materials selected and the temperature conditions allow, the tubes may simply be stacked and held in position by a protective surface, which may or may not be reflecting, connected at certain points to the surface to be protected.

If the surfaces are vertical and tall, or horizontal, the tubes may be assembled in bundles or groups in the form or outline of prisms having a rectangular, trapezoidal, triangular or T-shaped base.

In order that the invention may be more readily understood, various embodiments thereof will now be described with reference to the accompanying diagrammatic drawings, in which:

FIGURES 1 and 2 show sections through groups of elementary enclosures having a trapezoidal outline or section, FIGURES 3, 4 and 5 show diagrammatically how groups of elementary enclosures may be arranged along a wall, FIGURES 6 and 7 show examples of joints between elementary enclosures, and FIGURE 8 illustrates an example in which heat insulators have been applied to a heat exchanger.

In the embodiment shown in FIGURE 1, elementary enclosures comprising tubes 1 are assembled in bundles or groups by thin grids into which the tubes 1 are threaded.

These grids are made up of mobile arms 2 which are simply hooked onto the grid base 3, although they could be rigidly secured to the base 3 by soldering or welding, in the same way that the end arms 4 and 5 are attached to the base 3. The intermediate arms 6 at the top of the group are soldered or welded by their left hand ends to the upper arm 5.

The grid base 3 is secured by rivets 7 to brackets 8 soldered or welded to the wall 9 to be protected. These securing means allow a filler 10 constituted by a layer of an insulating cement or fibrous or other heat insulator to be held between the tubes 1 and the wall 9.

Thin sheets 11, which may or may not be metal, separate the layers of tubes 1 and prevent movement due to convection from being created over any considerable height. For the sake of convenience, only a single sheet 11 has been shown in the FIGURE 1, this sheet being in contact with the lower arm 4, but it will be understood that similar sheets are intercalated between each arm 2 or 6 and the tubes 1 located above it. A screen 12, having perforations 13 (which may be omitted), provides thermal and mechanical protection for the heat insulator and may, if desired, serve as framework for the tubes. It is soldered or welded to the ends of the arms 4, 2, 6 and 5.

In this embodiment the tubes 1 are assembled into bundles or groups in advance for example in the workshop, and when the time comes for final positioning, the grid bases 3 are simply hooked onto the wall 9.

In the embodiment shown in FIGURE 2, the tubes 1 are assembled into bundles or groups in situ and attached to the wall 9 by straps 14 soldered, welded or rivetted to the brackets 8. When they have been loaded, these straps 14 are joined at 15, for example by soldering or welding, and they may, if desired, serve to secure the arrangement to the protective screen 12, for example by soldering, welding, or by bolts, at various points 16, 17. As previously described, an insulating bed 10 may be held between the wall 9 to be protected and the heat insulator proper, and an insulating strip 18 may be inserted between the tubes 1 of different layers. Additionally anti-convection screens (not shown) may be arranged on the straps 14.

FIGURES 3, 4 and 5 show how the groups of tubes may be arranged along a wall 9 to be protected. In FIGURE 3, the groups 19 take the form of prisms with a rectangular base, and each of them is attached to the wall 9, for example, by an arrangement of the type illustrated in FIGURE 1 or 2. In FIGURES 4 and 5, the groups 20 and 21 take the form of prisms with a base having two opposite surfaces of different dimensions, namely trapezoidal and T-shaped respectively. It is then advantageous to attach only every other group to the wall 9 by its narrowest surface, the intermediate groups, which are applied against the wall by their widest surface, being merely inserted and held between the two adjacent groups fixed to the wall 9.

This latter arrangement allows the number of attachment points to be reduced, while distributing the stresses over the entire height of the wall, and subjecting each group to only limited crushing stress. Moreover, the seal between the heat insulator and the wall or surface is ensured for the whole assembly of groups, as is the seal between two successive groups, since the two attached groups hold the free groups in position by pressure.

The heat insulator may freely expand without prejudicing the efficiency of the joint and without causing separation of the elements. Moreover, expansion or displacement, if any, of the wall or surface to be protected may be absorbed by the heat insulator owing to the possibility of relative displacement of adjacent groups without risk of crushing the heat insulator, and without risk of cracks, as would occur in the case of a monobloc or monolythic material, or even using a heat insulator composed of thin sheets disposed parallel to the wall.

Moreover it is important to allow the tubes constituting the groups to expand longitudinally. For this purpose, the tubes are divided longitudinally into sections and these sections are joined together in such a way as to allow relative sliding movement between adjacent ends.

FIGURES 6 and 7 show one form of such a joint. In FIGURE 6 the adjacent ends of two sections of consecutive tubes 22 and 23, which are tapered when soldered or welded, or in some cases when evacuated, are connected by tubular end members 24 which are simply slid onto the tubes. These members 24 are quite short and have a diameter of the order of that of the tube. When, due to the geometry of the surface or wall, it is necessary for the tube sections to be of short length, these end members 24 may also be used to position the tubes or tube sections at the desired intervals. In all cases, they provide the continuity of the tubes while allowing them to expand freely longitudinally. If the tube is to take the shape of a ring or torus, a closed or continuous tube soldered or welded to itself may be used when the expansion is small or can be absorbed by the tolerances on the winding diameters. When the expansion is considerable, the tubes may be divided up into sections the ends of two successive sections being slid into an end member such as 24, which functions in the manner previously described.

In the embodiment illustrated in FIGURE 7, recessed tubes 25 having an outer diameter slightly less than inner diameter of the main tube sections 26 and 27 to be interconnected, are inserted into and soldered or welded to the latter sections 26 and 27 at 28, so as to block them and form recesses 29. Tube elements which may or may not be closed at their ends, and may be solid pins 30, having a smaller external diameter than the internal diameter of the recesses 29, are slid into two contiguous recesses 29. Rings 31 arranged on these tubes or pins 30 by any means (soldering, welding, crimping or machining) may facilitate the positioning of the heat insulator elements at the desired interval and, if desired, assist in the attachment of the groups of tubes to the wall.

The material used for the elements or tubes depends on the operational conditions, and in particular on the temperature, pressure and chemical nature of the fluid. This material may be metal (stainless steel, aluminium, ordinary steel or some other metal), the surfaces preferably being polished and reflecting so as to limit radiation. In the case of high temperatures or chemically corrosive atmospheres, all or part of the metal elements may be replaced by elements made of a refractory material (for example from a silicon, glass, or refractory steel).

The free surface of the heat insulator need not necessarily be protected. It may have to be protected should the surface exchanges by convection or radiation be likely to reach values that are too high, or if the flow of the fluid in contact with it must be undisturbed. In most cases the optional protective screen will advantageously be smooth and reflecting and be made, for example of stainless steel, aluminium, or ordinary steel surface-treated by painting or galvanisation.

Where there are extensive and rapid pressure variations, fine perforations may be provided in the protective screen, so as to allow the heat insulator to "breathe" without deformation, while limiting the gas or liquid movements.

If the temperature or chemical corrosion at high temperature make it necessary, the protective screen may be made of a refractory material as mentioned above with reference to the tubes.

Similarly, to the rear of the protective screen, the choice of the material, of the elementary enclosures or tubes and of their surface properties will be made as a function of the local operational conditions. In this way it is possible to reduce the cost of the heat insulator by keeping precious materials for the manufacture of the most vital elements.

The interior of the elementary enclosures or tubes will generally be occupied by a fluid at approximately atmospheric pressure, or, if desired, at a much lower pressure. The fluid is selected either to make for easy construction, in which case air will generally be used, or to overcome any possible risks of leakages and of contamination, in which case the same fluid will be used as that which is in contact with the heat insulator, but at a lower pressure.

In some cases, especially for long elementary enclosures or tubes, it is advantageous to provide direct communication between the interior of the elementary enclosures or tubes and the outer atmosphere, which avoids the need to evacuate and seal them. Moreover, such an arrangement may be used to provide a circulation of air or of any other fluid in the tubes or in some of the tubes, to allow heat dissipation in the vicinity of the wall to be heat-insulated if it is desired to limit the temperature of the wall for a given thickness of the heat insulator, or in the vicinity of the free surface of the heat insulator if this measure enables its temperature to be limited, for example, should its mechanical or chemical behaviour otherwise be prejudiced.

A heat insulator of the type described above is particularly suitable for "wetted" walls, i.e., walls in contact with fluids which are good conductors of heat (gases under pressure or liquids). For example, the heat insulator may be located inside a wall to be protected, or may itself constitute an intermediate wall separating and insulating two environments at different temperatures.

For space-saving and economy reasons, heat transfer fluids in heat exchangers must sometimes follow a tortuous path through the exchanger. It is then necessary to avoid heat exchanges between successive layers. Heat insulation of the intermediate walls is often made difficult, as aforementioned, by the presence over the two surfaces, and, after a certain period, in the entire mass of the heat insulator, of the surrounding fluid under pressure.

The heat insulator hereinbefore described enables this disadvantage to be overcome by employing an arrangement occupying a reduced volume. One embodiment of this arrangement is shown in FIGURE 8.

In this embodiment, the fluid arrives via the pipe 33 into the enclosure bounded by the outer wall 32, and descends between the wall 32 and an intermediate wall 34, then rises through the portion 35 of the heat exchanger, where it is heated, and leaves through the pipe 36. The intermediate wall 35, the two surfaces of which are in contact with the fluid at different temperatures, is heat-insulated by a heat insulator 37 according to the invention, constituted by toroidal tubes 38.

In chemical reactors under pressure, the cylindrical vessel (virole) which generally constitutes the casing, has to resist high pressures and at the same time is generally near high temperature corrosive fluids. An increase in the efficiency of the heat insulator makes it possible to reduce its thickness and hence to reduce the diameter and the thickness of the pressure-resistant metal container.

In nuclear reactors, the inner wall surfaces become difficult to protect if the cooling fluid is a good conductor of heat, which is generally the case (gases under pressure, water or molten metals). In the particular case of gas reactors, internal heat insulation of the containers under pressure is highly desirable (steel vessel), and may be indispensable (pre-stressed concrete vessel). Using the heat insulator described, it is possible either to reduce the protective thicknesses and hence the diameter of the vessel, which is an important factor in the cost, or to reduce the thermal fluxes to be dissipated by the cooling system, which may therefore be simplified.

I claim:

1. Thermal insulator applied against a wall, comprising a plurality of sealed tubes containing a fluid, arranged with their longitudinal axes extending parallel to one another and parallel to the wall, assembly means for connecting said tubes in a plurality of distinct bundles, in the form of prisms, each constituted by an assembly of juxtaposed tubes disposed in a plurality of superimposed layers, said bundles presenting, in profile, two opposite parallel end faces, and lateral faces connecting said end faces, fixing means for fixing at least some of said bundles on the wall, so as to stack said bundles against one another along said wall in a direction perpendicular to the axes of said tubes, one of said end faces coming against said wall, a perforated screen parallel to said wall, and means for fixing said screen to said assembly means on the other of the said end faces.

2. Thermal insulator applied against a wall, comprising a plurality of sealed tubes containing a fluid, arranged with their longitudinal axes extending parallel to one another and parallel to said wall, assembly means for connecting said tubes in a plurality of distinct bundles, in the form of prisms, each constituted by an assembly of said tubes juxtaposed in a plurality of superimposed layers, thin anti-convection sheets inserted between at least some of said layers, and said bundles presenting in profile, two opposite parallel end faces, and lateral faces connecting said end faces, the first of said end faces being larger than the second, fixing means for fixing alternate bundles on the wall with the second of said end faces against said wall, whilst the other bundles present the first of their said end faces against said wall and are held in place against the latter by said alternate bundles, so that said bundles are stacked against one another along said wall in a direction perpendicular to the axes of said tubes, a perforated screen disposed parallel to said wall, and means for fixing said screen to said assembly means on that end face which is opposite to the end face contacting said wall.

3. Thermal insulator adapted for application against a wall surface, comprising a plurality of sealed tubes containing a fluid, assembly means for locating said tubes in a plurality of distinct generally prism-like bundles, each of said bundles being constituted by an assembly of juxtaposed tubes in a plurality of superimposed layers, said assembly means comprising, at least for some of said bundles, a plurality of arms each carrying at least one row of tubes, at least one base plate and means for fixing one end of said arms to said base plate, and fixing means for fixing at least some of said bundles on the wall surface, with the longitudinal axes of said tubes extending parallel to one another and to the wall surface, so as to stack said bundles against one another along the wall surface in a direction perpendicular to the axes of said tubes, said fixing means comprising brackets and means for fixing said base plate to said brackets.

References Cited by the Examiner

UNITED STATES PATENTS

| | | | |
|---|---|---|---|
| 1,833,633 | 11/1931 | Bodman | 220—9 |
| 2,043,445 | 6/1936 | Oxhandler | 72—16 |
| 2,300,059 | 10/1942 | Perry | 105—3 |
| 2,440,245 | 4/1948 | Chivigny | 250—27.5 |
| 3,144,160 | 8/1964 | Johnson et al. | 220—9 |

FOREIGN PATENTS

| | | |
|---|---|---|
| 677,398 | 1/1964 | Canada. |
| 345,145 | 12/1936 | Italy. |
| 108,035 | 7/1917 | Great Britain. |

THERON E. CONDON, *Primary Examiner.*

GEORGE E. LOWRANCE, LOUIS G. MANCENE, JAMES R. GARRETT, *Examiners.*

R. A. JENSEN, *Assistant Examiner.*